(12) United States Patent
Zhuang et al.

(10) Patent No.: US 11,665,426 B2
(45) Date of Patent: May 30, 2023

(54) AUTOMATIC FOCUS FOLLOWING, DIMMING AND LIGHT TRACKING DEVICE

(71) Applicant: SHENZHEN YONGNUO PHOTOGRAPHIC EQUIPMENT CO., LTD., Shenzhen (CN)

(72) Inventors: Jiannan Zhuang, Shenzhen (CN); Yongsheng Zhuang, Shenzhen (CN); Guangsheng Kuang, Shenzhen (CN); Lianggen Liu, Shenzhen (CN)

(73) Assignee: SHENZHEN YONGNUO PHOTOGRAPHIC EQUIPMENT CO., LTD., Shenzhen (CN)

( * ) Notice: Subject to any disclaimer, the term of this patent is extended or adjusted under 35 U.S.C. 154(b) by 183 days.

(21) Appl. No.: 17/242,257

(22) Filed: Apr. 27, 2021

(65) Prior Publication Data

US 2022/0345632 A1  Oct. 27, 2022

(51) Int. Cl.
| | | |
|---|---|---|
| *F21V 21/15* | (2006.01) | |
| *H04N 23/67* | (2023.01) | |
| *G03B 13/36* | (2021.01) | |
| *F21V 23/04* | (2006.01) | |
| *F21W 131/406* | (2006.01) | |

(52) U.S. Cl.
CPC ........... *H04N 23/671* (2023.01); *F21V 21/15* (2013.01); *F21V 23/0471* (2013.01); *G03B 13/36* (2013.01); *F21W 2131/406* (2013.01)

(58) Field of Classification Search
CPC .. F21S 8/00; F21V 14/02; F21V 21/15; F21V 23/0471; F21W 2131/105; F21W 2131/406; G03B 13/36; H04N 5/232121
See application file for complete search history.

(56) References Cited

U.S. PATENT DOCUMENTS

| 10,295,161 B1* | 5/2019 | Shih ........................ F21V 21/30 |
|---|---|---|
| 2013/0010466 A1* | 1/2013 | Cavenati ................... F21S 8/00 |
| | | 362/249.02 |
| 2013/0155672 A1* | 6/2013 | Vo ........................... F21V 21/15 |
| | | 362/382 |
| 2015/0308642 A1* | 10/2015 | Vo ........................ H05B 47/155 |
| | | 362/648 |
| 2017/0130945 A1* | 5/2017 | Kitano ..................... H04B 1/38 |
| 2018/0112859 A1* | 4/2018 | Yamamoto .............. F21V 21/30 |
| 2018/0249559 A1* | 8/2018 | Sakurai ................... F21V 21/30 |
| 2020/0300445 A1* | 9/2020 | Fujisawa ................. F21V 21/30 |

(Continued)

*Primary Examiner* — Zheng Song

(57) ABSTRACT

The present invention belongs to the technical field of light tracking devices, and is specifically an automatic focus following, dimming and light tracking device comprising a Z-axis rotating focus following mechanism, an X-axis rotating focus following mechanism, and a Y-axis translational focusing mechanism. The Z-axis rotating focus following mechanism comprises a pedestal and a surface shell rotating about a Z-axis. A tracking and positioning module is provided in front of the surface shell. A lamp holder body rotating about an X-axis is provided on the top surface of the surface shell. A lens, a distance measuring unit and an illuminance measuring unit are provided on the front end of the lamp holder body. The lamp holder body is provided internally with a lamp holder assembly to reciprocate linearly along a Y-axis. The lamp holder assembly is provided relative to the lens. During use, manual intervention is not required.

10 Claims, 4 Drawing Sheets

(56) References Cited

U.S. PATENT DOCUMENTS

2021/0199273 A1\* 7/2021 Jurik ................. F21V 21/30
2021/0310636 A1\* 10/2021 Melzner ............. F21V 23/04
2021/0392462 A1\* 12/2021 Feeney .............. F21V 14/04

\* cited by examiner

AUTOMATIC FOCUS FOLLOWING, DIMMING AND LIGHT TRACKING DEVICE

TECHNICAL FIELD

The present invention belongs to the technical field of light tracking devices, and is specifically an automatic focus following, dimming and light tracking device.

BACKGROUND ART

The light tracking functions of conventional stage lighting systems are realized in two modes: the first one is manual control of stage lamp holders by lighting engineers; the second one is to set the traveling path of light in advance by means of a stage light console, and in this case, actors will have a walk show according to a pre-set light tracking procedure. The two conventional modes are limited by sites, devices and human resources, and stage errors readily occur.

In recent years, a method for alleviating disadvantages above has been proposed, namely, light tracking of stage lights is controlled by means of computers and with the indoor positioning technology, which can save human resource costs, and avoid errors in stage lighting. However, proper modification is still needed for stages.

With the popularization and application of 4G and 5G, microfilm and short video industries are flourishing. Anyone may be an actor, and anywhere may be a stage. The conventional stage light tracking functions cannot be adapted to the requirements in smart times. Different industries are overlapped and penetrated such that the light tracking functions are not limited to stage performance, and are also innovatively applied in mobile operation at night and live videos. Therefore, there is a badly need for developing a smart light tracking device to realize automatic focus following, positioning, distance measurement, dimming, and control of light spot sizes without manual intervention.

SUMMARY OF THE INVENTION

For solving the problem in the background art above, the present invention provides an automatic focus following, dimming and light tracking device. Light tracking with the device is not limited by sites, devices, and human resources. During use, manual intervention is not required. The device can automatically realize focus following for positioning, distance measurement, dimming, and control of light spot sizes, and can be applied in occasions such as stage light following, mobile operation at night, and live videos.

The following technical solutions are used in the present invention: an automatic focus following, dimming and light tracking device comprising a Z-axis rotating focus following mechanism, an X-axis rotating focus following mechanism, and a Y-axis translational focusing mechanism, wherein the Z-axis rotating focus following mechanism comprises a pedestal and a surface shell located on the upper end of the pedestal; the pedestal is rotating relative to the surface shell about a Z-axis; a tracking and positioning module is provided in front of the surface shell; an X-axis rotating focus following mechanism is provided on the top surface of the surface shell;

the X-axis rotating focus following mechanism comprises a lamp holder body rotating about an X-axis and connected on the top end of the surface shell; the front end of the lamp holder body is provided with a lens, a distance measuring unit and an illuminance measuring unit; the lamp holder body is provided internally with a Y-axis translational focusing mechanism which comprises a lamp holder assembly provided opposite to the lens and moving translationally along a Y-axis direction.

Further, the Z-axis rotating focus following mechanism also comprises a middle shell, a Z-axis motor and a battery. The middle shell is fixed on the lower end of the surface shell, and is rotatably connected with the pedestal. The Z-axis motor and the battery are fixedly provided on the middle shell. The output shaft of the Z-axis motor is fitted and connected with the pedestal. The Z-axis motor, the surface shell, the middle shell, and the pedestal are provided coaxially.

Further, a bearing part is provided at a place where the middle shell is rotatably connected with the pedestal. The output shaft of the Z-axis motor is sleeved thereon with a first motor protection part and a second motor protection part.

Further, the X-axis rotating focus following mechanism comprises an X-axis motor and a rotary shaft part. The X-axis motor is fixed on the surface shell, and the output shaft of the X-axis motor is provided in parallel to the X-axis. The rotary shaft part and the output shaft of the X-axis motor are fitted and connected with each other. The lamp holder body is fixed on the rotary shaft part.

Further, the distance measuring unit comprises a ranging sensor and a sensor lens which is fixed outside the lamp holder body. The illuminance measuring unit comprises an illuminance sensor. The illuminance sensor is located in the lamp holder body, and is provided close to the lens.

Further, the Y-axis translational focusing mechanism comprises a stepper motor and a screw. The stepper motor is fixedly provided in the lamp holder body. The lamp holder assembly is threadedly connected with the screw. The stepper motor drives the lamp holder assembly to reciprocate linearly along a Y-axis.

Further, the lamp holder assembly comprises a lamp bead and a lamp cup. The lamp cup is threadedly connected with the screw, and the lamp bead is fixed within the lamp cup. The lamp bead, the lamp cup and the lens are provided coaxially.

Further, the device also comprises a light spot control unit which comprises a main control chip located within the lamp holder body. The ranging sensor, the illuminance sensor, and the stepper motor are electrically connected with the main control chip.

Further, the tracking and positioning module comprises a detection probe fixed on the surface shell, a circuit board fixed in the surface shell, and an operating system chip fixed on the circuit board.

Preferably, the lens is a convex lens or a Fresnel lens.

Preferably, the sensor lens is optical diffusing glass or a Fresnel lens.

As compared with the prior art, the beneficial effects of the present invention are as follows:

(1) Use of the automatic focus following, dimming and light tracking device in the present invention is not limited by sites, devices, and human resources. During use, manual intervention is not required. The device can automatically realize focus following for positioning, distance measurement, dimming, and control of light spot sizes, and can be applied in occasions such as stage light following, mobile operation at night, and live videos.

(2) The automatic focus following, dimming and light tracking device in the present invention captures the position, characteristic or identification of a focus following object by means of the detection probe of a tracking and positioning module, and locks and tracks the same such that the light tracking device is simpler, and carries out tracking more accurately, and thus the focus following object will not be missing easily.

(3) The automatic focus following, dimming and light tracking device in the present invention is provided with a ranging sensor which measures the distance between the device and a focus following object in a real-time manner.

(4) The automatic focus following, dimming and light tracking device in the present invention measures the actual luminance of the light at the lamp cup by means of an illuminance sensor, and transfers the same to the main control chip which calculates the light luminance at the focus following object according to the distance from the focus following object and the distance from the lamp cup, such that the illuminance at the focus following object maintains constant and complies with a set value.

(5) The automatic focus following, dimming and light tracking device in the present invention calculates the diameter of a light spot at a focusing following object according to the distance from the focus following object by means of the main control chip, outputs pulse information to drive a stepper motor which drives the screw such that the lamp cup moves. The light emitted from the lamp cup irradiates on a focus following object through a lens.

BRIEF DESCRIPTION OF THE DRAWINGS

For explaining the technical solutions in the examples of the present invention or that in the prior art more explicitly, the figures that shall be used in the examples or in the description in the prior art will be introduced simply below. Obviously, the figures described below are only some examples in the present invention. Without involving any inventive effort, a person skilled in the art could further obtain other figures according to these figures.

Figure 1:
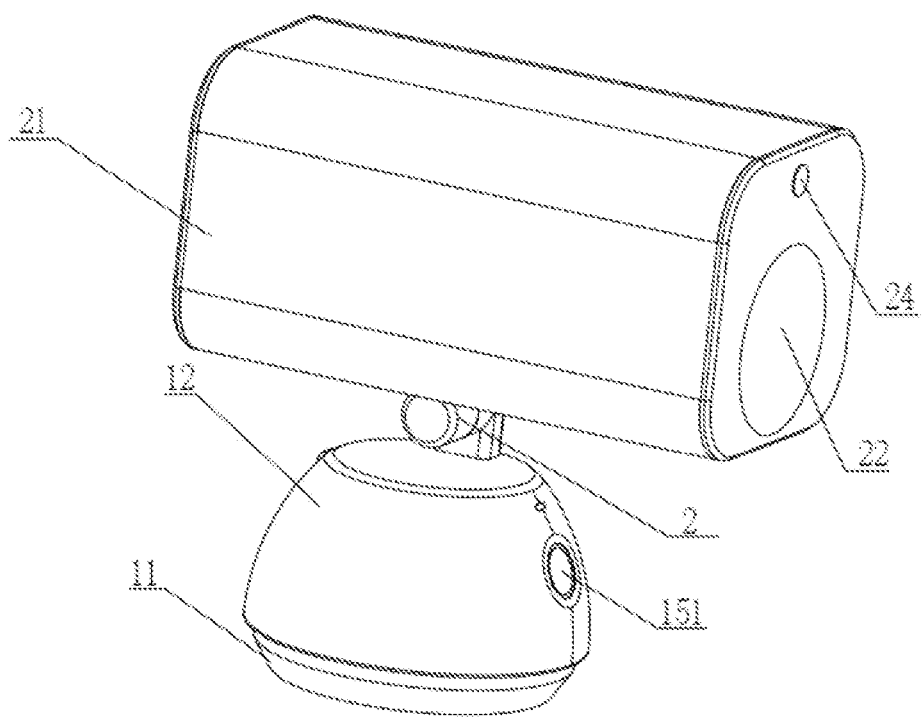
FIG. 1 is an appearance structure diagram of an automatic focus following, dimming and light tracking device in the present invention.

where 1—Z-axis rotating focus following mechanism; 11—pedestal; 12—surface shell; 13—middle shell; 131—mounting post; 14—Z-axis motor; 141—output shaft of the Z-axis motor; 142—screw of the Z-axis motor, 15—tracking and positioning module; 151—detection probe; 152—circuit board; 153—operating system chip; 16—battery; 17—bearing part; 18—first motor protection part; 19—second motor protection part; 2—X-axis rotating focus following mechanism; 21—lamp holder body; 22—lens; 23—ranging sensor; 24—sensor lens; 25—illuminance sensor; 26—X-axis motor; 27—rotary shaft part; 3—Y-axis translational focusing mechanism; 31—stepper motor; 32—screw; 33—lamp cup; 34—lamp bead; 35—main control chip; 4—focus following object; 5—focus; 6—light ray; 7—distance from a focus following object; 8—object distance; 9—image distance; 10—focal distance; 20—diameter of a light spot.

EMBODIMENTS

The technical solutions in the examples of the present invention would be described clearly and comprehensively by combining the figures in the present invention. Apparently, the examples described were only some of examples in the present invention, not all of the examples. All other examples obtained by a person skilled in the art based on the examples in the present invention and without involving any inventive effort fell within the scope of protection of the present invention.

As shown in FIGS. 1-4, the present invention provided an automatic focus following, dimming and light tracking device, comprising a Z-axis rotating focus following mechanism 1, an X-axis rotating focus following mechanism 2, and a Y-axis translational focusing mechanism 3, wherein the Z-axis rotating focus following mechanism 1 comprised a pedestal 11 and a surface shell 12 located on the upper end of the pedestal 11. The pedestal 11 was rotating relative to the surface shell 12 about a Z-axis. A tracking and positioning module 15 was provided in front of the surface shell 12. An X-axis rotating focus following mechanism 2 was provided on the top surface of the surface shell 12. The X-axis rotating focus following mechanism 2 comprised a lamp holder body 21 rotating about an X-axis and connected on the top end of the surface shell 12. The front end of the lamp holder body 21 was provided with a lens 22, a distance measuring unit and an illuminance measuring unit. The lamp holder body 21 was provided internally with a Y-axis translational focusing mechanism 3 which comprised a lamp holder assembly provided opposite to the lens 22 and moving translationally along a Y-axis direction.

What shall be explained was that a tracking and positioning module 15 in the examples was preferably selected from a humanoid motion tracking module which took photos of the characteristics such as humanoid, human face and clothing of a focus following object and carried out tracking and positioning according to changes inactions during operation. Of course, in other examples, the tracking and positioning module 15 may also be positioning modules such as GPS, WIFI, Bluetooth, UWB, infrared ray, IFID. ZIGBEE and ultrasound. The tracking and positioning functions that could be achieved the same as that in the examples fell within the scope of protection of the present invention.

In the present invention, the Z-axis rotating focus following mechanism 1 was identified by a tracking and positioning module 15 to lock the shape characteristics of a focus following object 4 and capture the moving direction and speed of the focus following object 4 about a Z-axis, subsequently controlling 360-degree rotation and focus following of the focus following object 4 by the light tracking device. The X-axis rotating focus following mechanism 2 was identified by the tracking and positioning module 15 to lock the shape characteristics of the focus following object 4 and capture the movement of the focus following object 4 in the height direction (e.g., a person stood or squatted), subsequently controlling automatic selection and focus following of the focus following object 4 at an angle by the lamp holder body 21. The Y-axis translational focusing mechanism 3 measured a distance 7 from the focus following object according to the distance measuring unit to adjust an object distance 8 between the lamp holder assembly and a lens 22 by a control system, thereby changing an image distance 9, realizing automatic adjustment of the diameter 20 of a light spot irradiated on the focus following object 4.

What shall be explained was that what defined the vertical up-down orientation was a Z-axis, what defined the direction for moving left and right was a Y-axis, and what defined the direction for moving back and forth was an X-axis in the present invention.

Specifically, the Z-axis rotating focus following mechanism 1 also comprised a middle shell 13, a Z-axis motor 14 and a battery 16. The middle shell 13 was fixed on the lower end of the surface shell 12, and was rotatably connected with the pedestal 13. The Z-axis motor 14 and the battery 16 were fixedly provided on the middle shell 13. The output shaft 141 of the Z-axis motor was fitted and connected with the pedestal 11, realizing rotatable movement of the middle shell 13 relative to the pedestal 11 about the Z-axis. The Z-axis motor 14, the surface shell 12, the middle shell 13, and the pedestal 11 in the present invention were provided coaxially such that the whole device had a good symmetry and a high aesthetic degree. The battery 16 in the present invention was used for providing electric power required for the operation of the light tracking device. In the examples, the electrical elements were electrically connected with a battery via electric wire or were directly powered through a power interface. An accommodating space for the electrical elements was formed between the middle shell 13 and the surface shell 12 in the present invention, and the Z-axis motor 14 was fixed within the accommodating space. It could be imaged that the output shaft 141 of the Z-axis motor was fitted and connected with the pedestal 11 in the present invention, thereby realizing the rotatable movement of the pedestal 11 relative to the surface shell 12. If the Z-axis motor 14 was immobile relative to the ground, the pedestal 11 rotatably moved about the Z-axis. According to the relativity of motion, if the pedestal 11 was immobile relative to the ground, the middle shell 13 and the surface shell 11 rotatably moved together about the Z-axis. Specifically, when the light tracking device in the present invention was operating, the surface shell 12 and the middle shell 13 constituted a rotatable and movable part of the tracking and positioning module 15, and the pedestal 11 was a fixed part. The Z-axis motor 14 was provided in the accommodating space such that the Z-axis motor 14 and the battery 16 rotated together with the tracking and positioning module 15, which could avoid occurrence of winding. Definitely, in the present invention, the Z-axis motor 14 and the battery 16 were also fixed in the pedestal 11. The device maintained the pedestal 14, the Z-axis motor 14 and the battery 16 not rotatable during operation, and the tracking and positioning module 15 was rotating. At this time, a rotating member could be powered by means of connection with a electric brush. Of course, the structure thereof may be changed slightly, which fell within the scope of protection of the present invention as long as occurrence of winding was avoided.

Preferably, the Z-axis motor 14 in the present invention was a deceleration motor to increase the torque, thereby realizing slow and stable rotational movements of the light tracking device.

Figure 2:
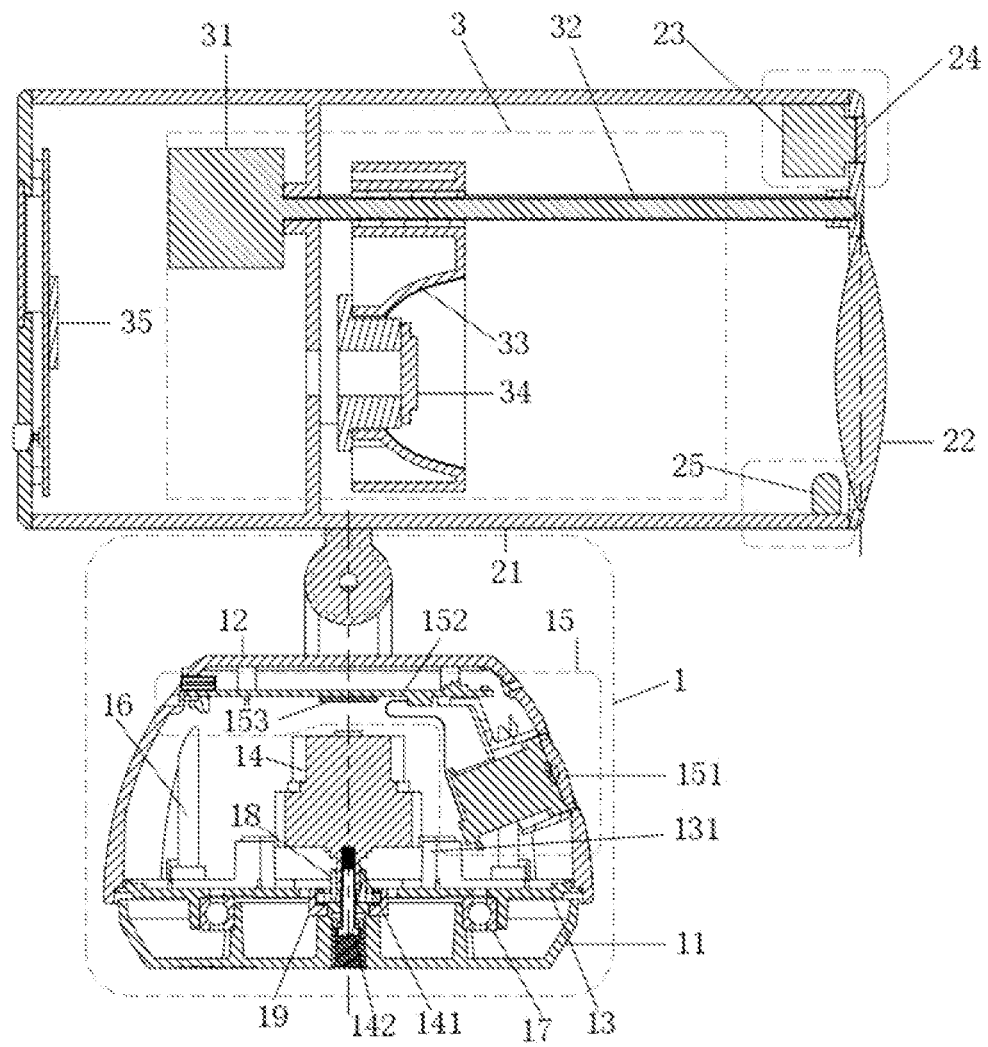
FIG. 2 is a section view of the automatic focus following, dimming and light tracking device in the present invention.

Specifically, as shown in FIG. 2, a bearing part 17 was provided at a place where the middle shell 13 was rotatably connected with the pedestal 11; the output shaft 141 of the Z-axis motor was sleeved thereon with a first motor protection part 18 and a second motor protection part 19.

Specifically, mounting posts 131 were symmetrically provided on the upper end of the middle shell 14. The Z-axis motor 14 was mounted on a mounting post 131 through a mounting foot of the Z-axis motor 14. There was an internal thread through the ends of the output shaft at the center of the output shaft 141 of the Z-axis motor. A screw 142 of the Z-axis motor through the pedestal 11 was fitted and tightened with the inner thread, fixing the output shaft 141 of the Z-axis motor together with the pedestal 11. The peripheral surface of the output shaft 141 of the Z-axis motor cooperated with a first motor protection part 18 for limiting, the first motor protection part 18 cooperated with the second motor protection part 19 for limiting, and the second motor protection part 19 cooperated with the pedestal 11 for limiting. In the present invention, the friction at the place where the middle shell 13 and the pedestal 11 rotated was reduced by providing a bearing part 17. Arranging a first motor protection part 18 and a second motor protection part 19 prevented damage to the gear set of the Z-axis motor 14 caused by the force artificially applied on the output shaft 141 of the Z-axis motor.

Figure 4:
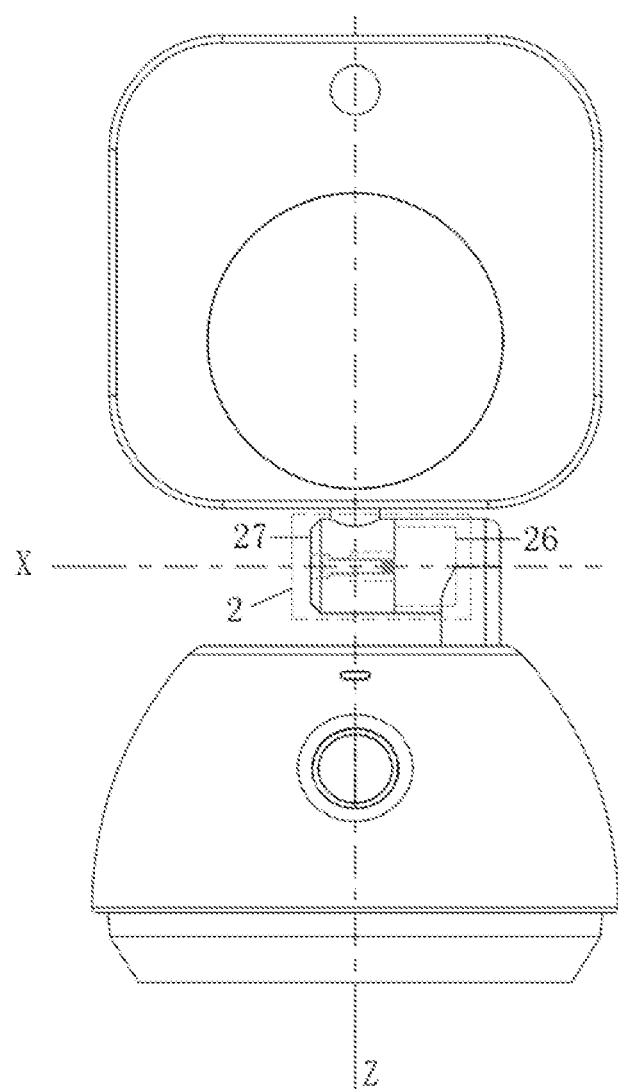
FIG. 4 is a right elevation of the automatic focus following, dimming and light tracking device in the present invention.

Specifically, as shown in FIG. 4, the X-axis rotating focus following mechanism 2 comprised an X-axis motor 26 and a rotary shaft part 27. The X-axis motor 26 was fixed on the surface shell 12, and the output shaft of the X-axis motor was provided in parallel to the X-axis. The rotary shaft part 27 and the output shaft of the X-axis motor were fitted and connected with each other. The lamp holder body 21 was fixed on the rotary shaft part 27. The rotary shaft part 27 moved rotatably about the X-axis, thereby driving the lamp holder body 21 to rotate at an angle up and down. In this case, the movement of the focus following object 4 could be tracked in a height direction.

Figure 3:
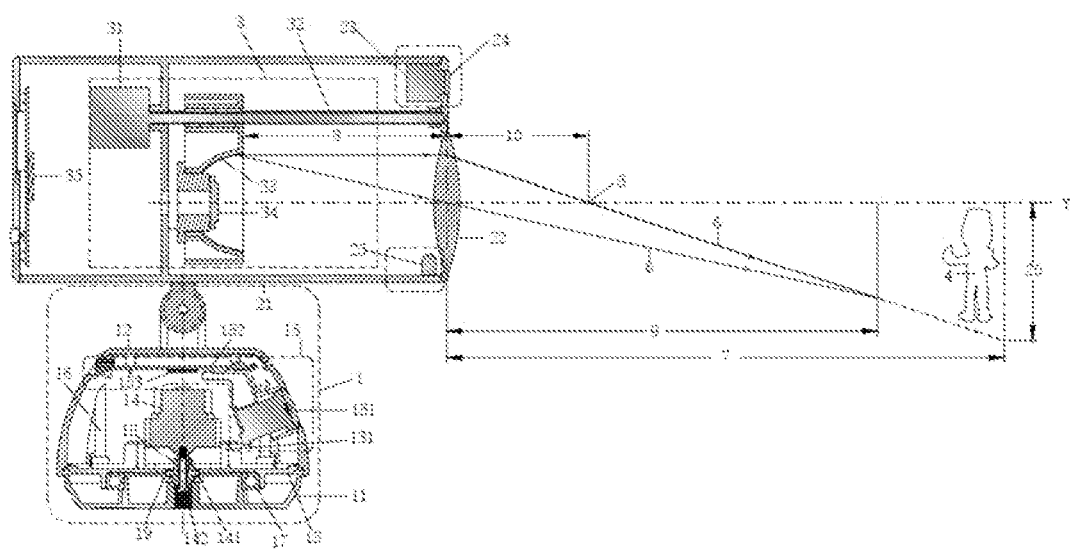
FIG. 3 is a schematic diagram of the section view of the automatic focus following, dimming and light tracking device in the present invention.

Specifically, as shown in FIGS. 2 and 3, the distance measuring unit comprised a ranging sensor 23 and a sensor lens 24. Preferably, the ranging sensor 23 was a TOF sensor, and the sensor lens 24 was optical diffusing glass which was fixed outside the lamp holder body 21. The TOF sensor emitted and modulated the infrared laser of a light pulse, which irradiated on a focus following object 2 through the optical diffusing glass, and was then reflected back to the TOF sensor. The TOF sensor calculated a phase difference, measured the flight time of light, determined the distance 7 from a focus following object, and sent the same to the main control chip 35, thereby controlling the Y-axis translational focusing mechanism 3 by means of the main control chip 35 to realize focusing.

The illuminance measuring unit comprised an illuminance sensor 25 which was located in the lamp holder body 21, and was provided close to the lens. The illuminance sensor 25 was used for measuring the actual luminance of the light close to the lamp holder assembly, and transferring the same to the main control chip 35 which calculated the light luminance at the focus following object 4 according to the distance from the focus following object 7 and an object distance 8, such that the illuminance at the focus following object 4 maintained constant and complied with a set value. What shall be explained was that the ranging sensor in the present invention may be a ranging sensor such as laser, ultrasound and infrared. The tracking and positioning functions that could be achieved the same as that in the examples fell within the scope of protection of the present invention.

Specifically, the Y-axis translational focusing mechanism 3 comprised a stepper motor 31 and a screw 32. The stepper motor 31 was fixedly provided in the lamp holder body 21. The lamp holder assembly was threadedly connected with the screw 32. The stepper motor 31 drove the lamp holder assembly to reciprocate linearly along the Y-axis. The lamp holder assembly comprised a lamp bead 34 and a lamp cup 33. The lamp cup 33 was threadedly connected with the screw 32, and the lamp bead 34 was fixed within the lamp cup 33. The lamp bead 33, the lamp cup 34 and the lens 33 were provided coaxially.

Specifically, the device further comprised a light spot control unit which comprised a main control chip 35 located in the lamp holder body 21. The ranging sensor 23, the illuminance sensor 25, and the stepper motor 31 were electrically connected with the main control chip 35.

The main control chip 35 in the present application calculated the diameter of a light spot at the focus following object 4 according to the distance 7 from the focus following object, and outputted pulse information to drive a stepper motor 31 to drive a screw 32 such that a lamp cup 33 moved. A light ray 6 emitted from the lamp cup 33 irradiated on the focus following object 4 through a lens 22. The lamp cup 33, the light ray 6 and the lens 22 constituted a zoom light path system with the zoom formula as follows: $1/u+1/v=1/f$, where u=object distance (8), v=image distance (9), and f=focal distance (10), wherein the focus is located at 5.

Specifically, as shown in FIG. 2, the tracking and positioning module 15 comprised a detection probe 151 fixed on the surface shell 12, a circuit board 152 fixed in the surface shell 12, and an operating system chip 153 fixed on the circuit board 152. Preferably, a humanoid motion tracking module was used for the tracking and positioning module 15 in the embodiments, and a wide-angle camera was used for the detection probe 151. With the wide-angle camera, the position and characteristic of a focus following object 4 were captured, and locking and tracking thereof were carried out. In the specific occasions for use, the light tracking system in the present invention was simpler and carried out tracking more accurately as compared with the light tracking systems in the indoor positioning modes such as WIFI and ultrasound, and a focus following object would not be missing easily.

Preferably, the lens 22 was a convex lens or a Fresnel lens.

Use of the automatic focus following, dimming and light tracking device in the present invention was not limited by sites, devices, and human resources. During use, manual intervention was not required. The device could automatically realize focus following for positioning, distance measurement, dimming, and control of light spot sizes, and could be applied in occasions such as stage light following, mobile operation at night, and live videos.

The present invention was further described above through embodiments. However, it shall be understood that the specific description here shall not be understood as limiting the essence and scope of protection of the present invention. Various modifications made to the embodiments above by a person skilled in the art after reading the description fell within the scope of protection of the present invention.

The invention claimed is:

1. An automatic focus following, dimming and light tracking device, characterizing in comprising a Z-axis rotating focus following mechanism, an X-axis rotating focus following mechanism, and a Y-axis translational focusing mechanism, wherein
the Z-axis rotating focus following mechanism comprises a pedestal and a surface shell located on an upper end of the pedestal; the pedestal is rotating relative to the surface shell about a Z-axis; a tracking and positioning module is provided in front the surface shell; the X-axis rotating focus following mechanism is provided on a top surface of the surface shell;
the X-axis rotating focus following mechanism comprises a lamp holder body rotating about an X-axis and connected on the top end of the surface shell; the front end of the lamp holder body is provided with a lens, a distance measuring unit and an illuminance measuring unit; the lamp holder body is provided internally with a Y-axis translational focusing mechanism which comprises a lamp holder assembly provided opposite to the lens and moving translationally along a Y-axis direction.

2. The automatic focus following, dimming and light tracking device according to claim 1, characterizing in that the distance measuring unit comprises a ranging sensor and a sensor lens which is fixed outside the lamp holder body; the illuminance measuring unit comprises an illuminance sensor which is located in the lamp holder body, and is provided close to the lens.

3. The automatic focus following, dimming and light tracking device according to claim 2, characterizing in that the Y-axis translational focusing mechanism comprises a stepper motor and a screw; the stepper motor is fixedly provided in the lamp holder body; the lamp holder assembly is threadedly connected with the screw; the stepper motor drives the lamp holder assembly to reciprocate linearly along a Y-axis.

4. The automatic focus following, dimming and light tracking device according to claim 3, characterizing in that the lamp holder assembly comprises a lamp bead and a lamp cup, the lamp cup being threadedly connected with the screw, and the lamp bead being fixed within the lamp cup; the lamp bead, the lamp cup and the lens are provided coaxially.

5. The automatic focus following, dimming and light tracking device according to claim 3, characterizing in further comprising a light spot control unit which comprises a main control chip located within the lamp holder body; the ranging sensor, the illuminance sensor, and the stepper motor are electrically connected with the main control chip.

6. The automatic focus following, dimming and light tracking device according to claim 1, characterizing in that the Z-axis rotating focus following mechanism further comprises a middle shell, a Z-axis motor and a battery, the middle shell being fixed on a lower end of the surface shell, and rotatably connected with the pedestal, the Z-axis motor and the battery being fixedly provided on the middle shell, an output shaft of the Z-axis motor being fitted and connected with the pedestal, and the Z-axis motor, the surface shell, the middle shell, and the pedestal being provided coaxially.

7. The automatic focus following, dimming and light tracking device according to claim 6, characterizing in that a bearing part is provided at a place where the middle shell is rotatably connected with the pedestal; the output shaft of the Z-axis motor is sleeved thereon with a first motor protection part and a second motor protection part.

8. The automatic focus following, dimming and light tracking device according to claim 1, characterizing in that the X-axis rotating focus following mechanism comprises an X-axis motor and a rotary shaft part, the X-axis motor being fixed on the surface shell, and an output shaft of the X-axis motor being provided in parallel to the X-axis; the rotary shaft part and the output shaft of the X-axis motor being fitted and connected with each other; the lamp holder body being fixed on the rotary shaft part.

9. The automatic focus following, dimming and light tracking device according to claim 1, characterizing in that the tracking and positioning module comprises a detection probe fixed on the surface shell, a circuit board fixed in the surface shell, and an operating system chip fixed on the circuit board.

10. The automatic focus following, dimming and light tracking device according to claim 1, characterizing in that the lens is a convex lens or a Fresnel lens, and the sensor lens is optical diffusing glass or a Fresnel lens.

\* \* \* \* \*